US012570493B2

(12) United States Patent
Nishimura

(10) Patent No.: US 12,570,493 B2
(45) Date of Patent: Mar. 10, 2026

(54) MEDIUM DISCHARGE DEVICE AND IMAGE READING DEVICE

(71) Applicant: SEIKO EPSON CORPORATION, Tokyo (JP)

(72) Inventor: Yoichiro Nishimura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 47 days.

(21) Appl. No.: 18/779,011

(22) Filed: Jul. 21, 2024

(65) Prior Publication Data

US 2025/0033915 A1     Jan. 30, 2025

(30) Foreign Application Priority Data

Jul. 24, 2023    (JP) .................................. 2023-119784

(51) Int. Cl.
| | |
|---|---|
| *B65H 29/12* | (2006.01) |
| *B65H 29/70* | (2006.01) |
| *B41J 13/10* | (2006.01) |
| *H04N 1/00* | (2006.01) |

(52) U.S. Cl.
CPC ........... *B65H 29/125* (2013.01); *B65H 29/70* (2013.01); *B41J 13/106* (2013.01); *B65H 2404/62* (2013.01); *H04N 1/00631* (2013.01)

(58) Field of Classification Search
CPC ............ B65H 29/70; B65H 2404/1431; B65H 29/125
See application file for complete search history.

(56) References Cited

U.S. PATENT DOCUMENTS

| | | | | |
|---|---|---|---|---|
| 5,896,240 | A * | 4/1999 | Yamazaki | ............... F16C 17/02 |
| 8,714,546 | B2 * | 5/2014 | Saito | ...................... B65H 29/70 |
| | | | | 271/314 |
| 8,800,987 | B2 * | 8/2014 | Kimura | ............... B65H 29/145 |
| | | | | 271/272 |
| 9,395,671 | B1 * | 7/2016 | Yano | .................. G03G 15/6573 |
| 10,289,067 | B2 * | 5/2019 | Enomoto | ........... G03G 15/6552 |
| 2010/0247196 | A1 * | 9/2010 | Ichiki | .............. G03G 15/6552 |
| | | | | 399/381 |

FOREIGN PATENT DOCUMENTS

| | | | | |
|---|---|---|---|---|
| JP | H05-092631 A | | 4/1993 | |
| JP | 2016124657 A | * | 7/2016 | ............. B65H 29/70 |

* cited by examiner

*Primary Examiner* — Patrick Cicchino
(74) *Attorney, Agent, or Firm* — WORKMAN NYDEGGER

(57) ABSTRACT
A medium discharge device includes a discharge drive roller configured to contact a first surface of a medium, a discharge driven roller that is configured to contact a second surface of the medium and nip the medium between itself and the discharge drive roller, a driven roller shaft, and a discharge assisting member configured to contact the second surface of the medium to be discharged, that has a larger diameter than the discharge driven roller, and that rotates integrally with the discharge driven roller. The discharge driven roller has a shaft hole through which the driven roller shaft passes, an inner peripheral surface of the shaft hole and an outer peripheral surface of the driven roller shaft slide with rotation of the discharge driven roller, and a quick-drying lubricant is used between the inner peripheral surface of the shaft hole and the outer peripheral surface of the driven roller shaft.

9 Claims, 15 Drawing Sheets

MEDIUM DISCHARGE DEVICE AND IMAGE READING DEVICE

The present application is based on, and claims priority from JP Application Serial Number 2023-119784, filed Jul. 24, 2023, the disclosure of which is hereby incorporated by reference herein in its entirety.

BACKGROUND

1. Technical Field

The present disclosure relates to a medium discharge device for discharging a medium, and an image reading device provided with the medium discharge device.

2. Related Art

When discharging the medium to outside of a printer or scanner by a roller pair, so that the rear end of the medium can be surely removed from between the roller pair, a configuration as shown in the JP-A-05-092631 may be adopted in which a protrusion having a larger diameter than the roller is provided and the rear end of the medium is fed in the discharge direction by the protrusion. JP-A-05-092631 also describes that the protrusion may be formed of urethane.

In the following description, such a protrusion is referred to as a discharge assisting member.

A lubricant is often used on a sliding surface of a roller rotation shaft. Here, sliding surface refers to a part of the outer peripheral surface of the rotation shaft of the roller, and indicates a portion that slides against another member. However, there has been a case in which a part of the lubricant moved to the discharge assisting member, and stuck to the medium, thereby staining the medium. In particular, when the discharge assisting member is formed of an elastic material, the discharge assisting member tends to absorb the lubricant, stick to the medium, and stain the medium, and there is room for improvement.

SUMMARY

In order to overcome the above described concern, a medium discharge device according to the present disclosure includes a discharge drive roller that is a roller configured to contact a first surface of a medium to be discharged and that is rotated by receiving power from a drive source; a discharge driven roller that is a roller configured to contact a second surface opposite from the first surface of the medium to be discharged, and that rotates in a driven manner while nipping the medium between itself and the discharge drive roller; a driven roller shaft that is a rotation shaft of the discharge driven roller; and a discharge assisting member that is a member configured to contact the second surface of the medium to be discharged, that has a larger diameter than the discharge driven roller, and that rotates integrally with the discharge driven roller, wherein the discharge driven roller has a shaft hole through which the driven roller shaft passes, an inner peripheral surface of the shaft hole and an outer peripheral surface of the driven roller shaft slide against each other with rotation of the discharge driven roller, and a quick-drying lubricant is used between the inner peripheral surface of the shaft hole and the outer peripheral surface of the driven roller shaft.

An image reading device according to the present disclosure includes the above medium discharge device and a reading section that is located upstream of the medium discharge device in a transport path of the medium and that reads the medium.

DESCRIPTION OF EMBODIMENTS

Figure 1:
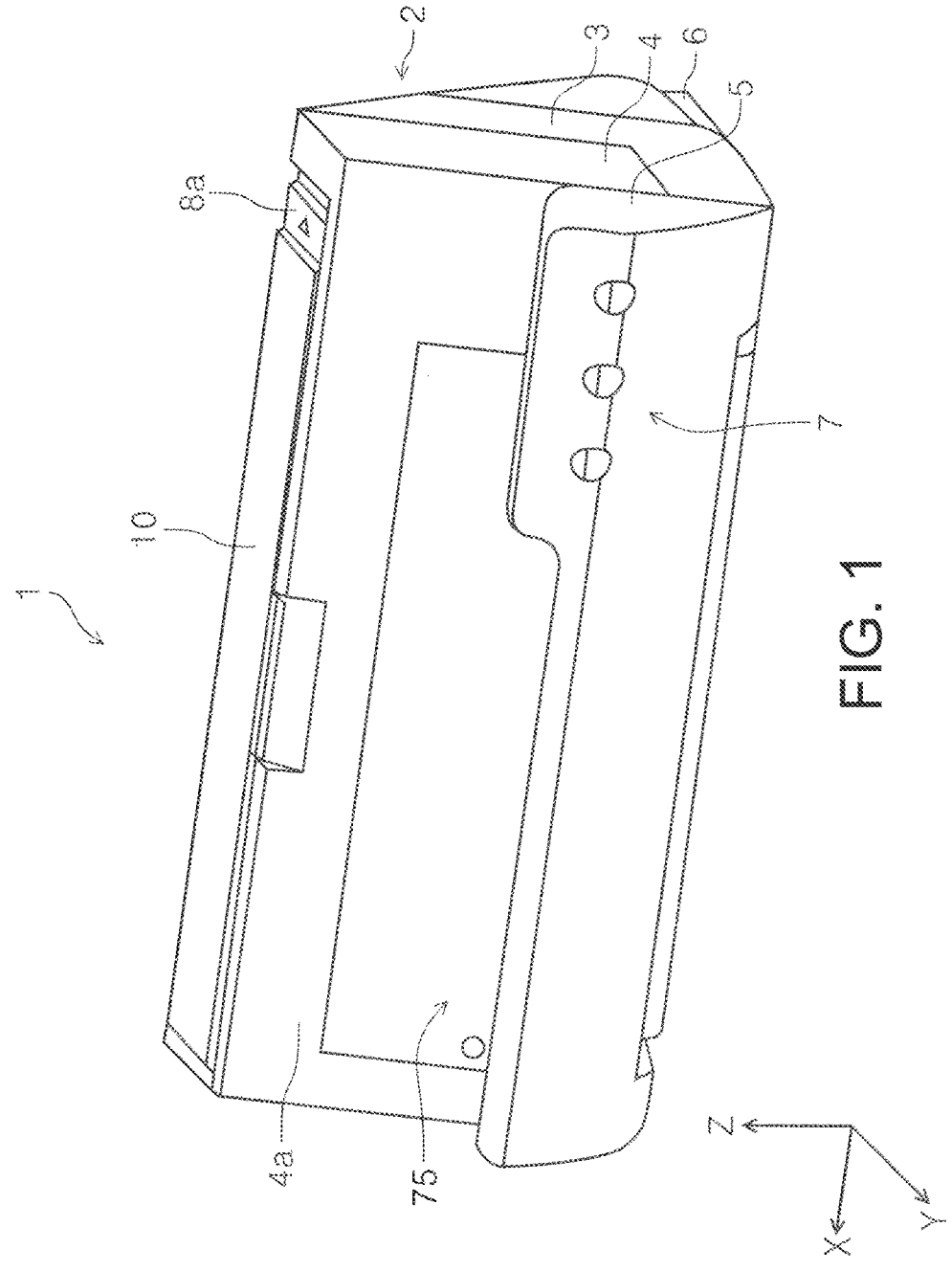
FIG. 1 is a perspective view of a scanner viewed from the front, in which a device main body is in a normal reading posture.

Hereinafter, the present disclosure will be generally described.

A medium discharge device according to a first aspect includes a discharge drive roller that is a roller configured to contact a first surface of a medium to be discharged and that is rotated by receiving power from a drive source; a discharge driven roller that is a roller configured to contact a second surface opposite from the first surface of the medium to be discharged, and that rotates in a driven manner while nipping the medium between itself and the discharge drive roller; a driven roller shaft that is a rotation shaft of the discharge driven roller; and a discharge assisting member that is a member configured to contact the second surface of the medium to be discharged, that has a larger diameter than the discharge driven roller, and that rotates integrally with the discharge driven roller, wherein the discharge driven roller has a shaft hole through which the driven roller shaft passes, an inner peripheral surface of the shaft hole and an outer peripheral surface of the driven roller shaft slide against each other with rotation of the discharge driven roller, and a quick-drying lubricant is used between the inner peripheral surface of the shaft hole and the outer peripheral surface of the driven roller shaft.

According to this aspect, since the quick-drying lubricant is used as the lubricant between the inner peripheral surface of the shaft hole and the outer peripheral surface of the driven roller shaft, it is possible to suppress the lubricant from moving to the discharge assisting member, and it is possible to suppress the lubricant from clinging to the medium and staining the medium.

In this specification, the term "the discharge assisting member has a diameter larger than the discharge driven roller" means that the maximum diameter of the discharge assisting member is larger than the maximum diameter of the discharge driven roller. Therefore, the discharge assisting member is not limited to a configuration in which the diameter is uniform along the peripheral direction.

A second aspect is an aspect according to the first aspect, wherein the discharge driven roller has a flange section and the discharge assisting member is provided to the flange section.

According to the present aspect, since the discharge driven roller has a flange section and the discharge assisting member is provided on the flange section, when a lubricant is interposed between the inner peripheral surface of the shaft hole and the outer peripheral surface of the driven roller shaft, a part of the lubricant easily moves to the discharge assisting member and easily stains the medium, but by the function and effect of the first aspect, it is possible to suppress the lubricant from clinging to the medium and staining the medium.

A third aspect is an aspect according to the first aspect, wherein the discharge assisting member is formed of an elastic material.

According to this aspect, since the discharge assisting member is formed of an elastic material, the rear end of the medium can be properly pushed out in the discharge direction.

Here, in the case where the discharge assisting member is formed of an elastic material, the discharge assisting member absorbs the lubricant, adheres to the medium, and easily stains the medium, but by the function and effect of the first aspect, it is possible to suppress the lubricant from adhering to the medium and staining the medium.

Note that the present aspect is not limited to the first aspect, and may be according to the second aspect.

A fourth aspect is an aspect according to the third aspect, wherein the discharge assisting member has a plurality of projections along a peripheral direction on an outer periphery thereof.

According to this aspect, since the discharge assisting member has a plurality of projections along the peripheral direction on the outer periphery thereof, the rear end of the medium can be appropriately discharged in the discharge direction.

Here, in the configuration in which the discharge assisting member has the plurality of the projections along the peripheral direction on the outer periphery, there are cases in which the projections may strongly press against the medium and, if the discharge assisting member absorbs the lubricant, the lubricant is likely to adhere to the medium from the projections, that is, the medium is likely to be stained.

However, due to the function and effect of the first aspect described above, it is possible to suppress the lubricant from adhering to the medium and staining the medium.

A fifth aspect is an aspect according to the first aspect, further including a drive roller shaft that is a rotation shaft of the discharge drive roller and a restricting section configured to restrict deflection of the drive roller shaft, wherein the quick-drying lubricant is applied to the outer peripheral surface of the drive roller shaft at a position facing the restricting section.

According to this aspect, the restricting section can suppress deflection of the drive roller shaft. Since quick-drying lubricant is applied to the outer peripheral surface of the drive roller shaft at a position facing the restricting section, it is possible to suppress an increase in the rotational load of the drive roller shaft when the drive roller shaft abuts against the restricting section.

Here, when a lubricant is applied to the outer peripheral surface of the drive roller shaft, a part of the lubricant may move to the discharge assisting member, adhere to the medium, and stain the medium.

However, according to the present aspect, since the quick-drying lubricant is applied to the outer peripheral surface of the drive roller shaft at the position facing the restricting section, it is possible to suppress the lubricant from moving to the discharge assisting member, and it is possible to suppress the lubricant from adhering to the medium and staining the medium.

Note that the present aspect is not limited to the first aspect, and may be according to any of the second to fourth aspects.

A sixth aspect is an aspect according to the first aspect, wherein the driven roller shaft further includes a sliding section at another portion in addition to a portion facing the inner peripheral surface of the shaft hole and a non-quick-drying lubricant is used at the sliding section.

According to this aspect, the driven roller shaft has a sliding section at another portion in addition to the portion facing the inner peripheral surface of the shaft hole, and a non-quick-drying lubricant is used for the sliding section, whereby the effects of the first aspect described above can be obtained.

Note that the present aspect is not limited to the first aspect, and may be according to any of the second to fifth aspects.

A seventh aspect is an aspect according to the first aspect, wherein the discharge assisting member serves as a first discharge assisting member, and further comprising a second discharge assisting member that is a member configured to contact the second surface of the medium to be discharged, that has a diameter larger than that of the discharge driven roller, and that rotates integrally with the discharge driven roller, the second discharge assisting member is arranged to outside of the first discharge assisting member in a width direction, which intersects the medium discharge direction, the discharge driven roller and the first discharge assisting member are provided so as to be displaceable in a direction of moving toward and away from the discharge drive roller, and torque of the discharge driven roller is transmitted to the second discharge assisting member through a shaft and a universal joint.

In the case where the discharge assisting member is provided in the vicinity of the center in the width direction, a feeding effect in the discharge direction cannot be applied to the side edges at the rear end of the medium. Note that, hereinafter, the feeding effect in the discharge direction to be given to the rear end of the medium may be referred to as a kick-out effect.

In particular, the side edges at the rear end of the medium tend to curl, and when the discharge assisting member is provided near the center in the width direction, the rear end of the medium cannot be kicked out appropriately. Therefore, in order to provide a kick-out effect to the side edges at the rear end of the medium, it is necessary to further provide the discharge assisting members at the side edge positions.

However, in order to rotate the discharge assisting members provided at a side edges position, it is necessary to further extend the driven roller shaft in the shaft edge direction and transfer the torque from the driven roller shaft to the discharge assisting member. At this time, if the discharge driven roller is provided so as to be displaceable in accordance with the thickness of the medium, the discharge assisting member is also displaced with the discharge driven roller, and it is not possible to appropriately apply a kick-out effect to curled side edges at the rear end of the medium.

However, according to this aspect, since the second discharge assisting member is provided to the outside of the first discharge assisting member in the width direction, a kick-out effect can be provided to the side edges at the rear end of the medium or the vicinity thereof. Since the torque of the discharge driven roller is transmitted to the second discharge assisting member through the shaft and the universal joint, even if the discharge driven roller is displaced, the second discharge assisting member can easily maintain its position with respect to the medium, and a kick-out effect can be provided to the side edges at the rear end of the medium or the vicinity thereof without influence from the displacement of the discharge driven roller.

In the present specification, a side edge of the rear end of the medium means a width-direction side edge at the rear end of the medium, and outside in the width direction means a direction toward a side edge from a center position in the width direction of the medium.

Note that the present aspect is not limited to the first aspect, and may be according to any of the second to sixth aspects.

An eighth aspect is an aspect according to the seventh aspect, wherein the universal joint serves as a first universal joint, and the first universal joint and a second universal joint that is positioned to outside of the first universal joint in the width direction, are positioned between the discharge driven roller and the second discharge assisting member, the second discharge assisting member is provided at a position adjacent to the second universal joint in the width direction, and the quick-drying lubricant is used in the second universal joint.

According to this aspect, since the universal joint serves as a first universal joint, and the first universal joint and a second universal joint, which is positioned to outside of the first universal joint in the width direction, are provided between the discharge driven roller and the second discharge assisting member, the second discharge assisting member can easily maintain the posture in addition to the position with respect to the medium when the discharge driven roller is displaced.

In addition, since the second discharge assisting member is provided at a position adjacent to the second universal joint in the width direction, when lubricant is applied to the second universal joint, a part of the lubricant easily moves to the second discharge assisting member and easily stains the medium. However, since a quick-drying lubricant is used for the second universal joint, it is possible to suppress movement of the lubricant from the second universal joint to the second discharge assisting member, and it is possible to suppress the lubricant from adhering to the medium and staining the medium.

An image reading device according to a ninth aspect of the present disclosure includes the medium discharge device according to any one of the first to eighth aspects and a reading section that is located upstream of the medium discharge device in a transport path of the medium and that reads the medium.

According to this aspect, in the image reading device, any of the effects of the first to eighth aspects described above can be obtained.

Hereinafter, the present disclosure will be described in detail.

As an example of the image reading device, a scanner 1 capable of reading at least one of a first side or a second side, which is opposite to the first side, of a document will be described below. The scanner 1 is a so-called sheet feed type scanner that reads a document, which is an example of a medium, while moving the document with respect to a reading section (to be described later).

In the present specification, the document includes not only a sheet-like document but also a card-like document or a pamphlet-like document.

Note that in the X-Y-Z coordinate system shown in each figure, the X-axis direction is the device width direction and also the document width direction. The Y-axis direction is the device depth direction, and the Z-axis direction is a direction along the vertical direction.

In the present embodiment, the +Y direction is the direction from the rear surface of the device to the front surface, and the −Y direction is the direction from the front surface of the device to the device surface. When viewed from the front of the device, the left direction is the +X direction, and the right direction is the −X direction.

Hereinafter, the direction in which the document is transported may be referred to as "downstream", and the opposite direction may be referred to as "upstream".

In the following description of different embodiments, the same components are denoted by the same reference numerals, and duplicate description will be avoided.

In FIG. 1, a scanner 1 includes a device main body 2 and a main body support section 6 for rotatably supporting the device main body 2.

The device main body 2 includes a first unit 3, a second unit 4, and a third unit 5.

The second unit 4 and the third unit 5 can integrally rotate relative to the first unit 3 about a rotation shaft (not shown). The reference numeral 8a indicates a lock release section, and the user can unlock the second unit 4 and the third unit 5 with respect to the first unit 3 by sliding the lock release section 8a in the −X direction. By rotating the second unit 4 and the third unit 5 relative to the first unit 3, a document feed path R1 and a reading transport path R2 (both to be described later) can be exposed.

The third unit 5 can rotate about a rotation shaft (not shown) relative to the first unit 3 and the second unit 4. By rotating the third unit 5 with respect to the first unit 3 and the second unit 4, an inversion transport path R3 (to be described later) can be exposed.

Figure 2:
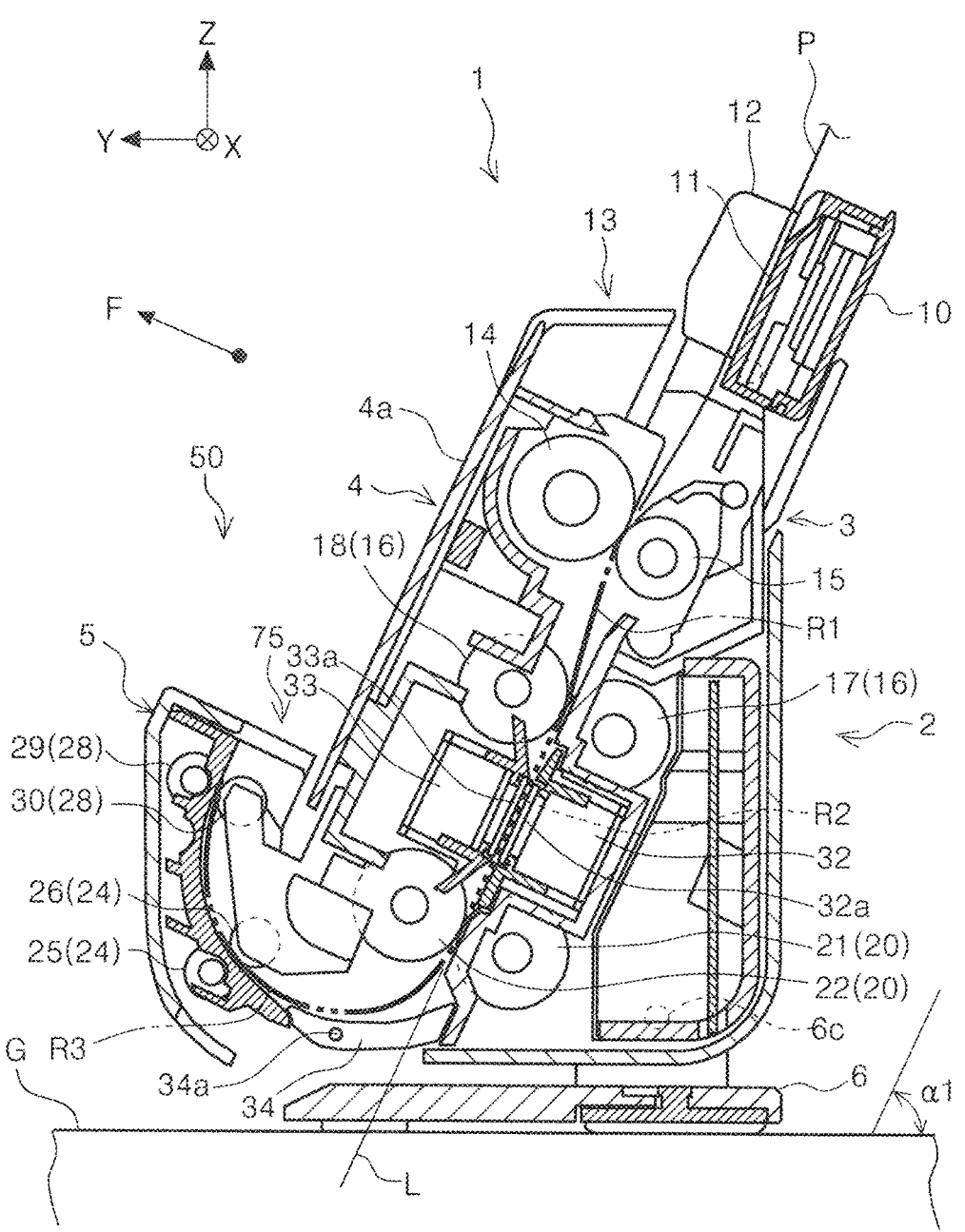
FIG. 2 is a cross-sectional view, as viewed from the width direction, of a document transport path of the scanner when the device main body is in the normal reading posture.
Figure 3:
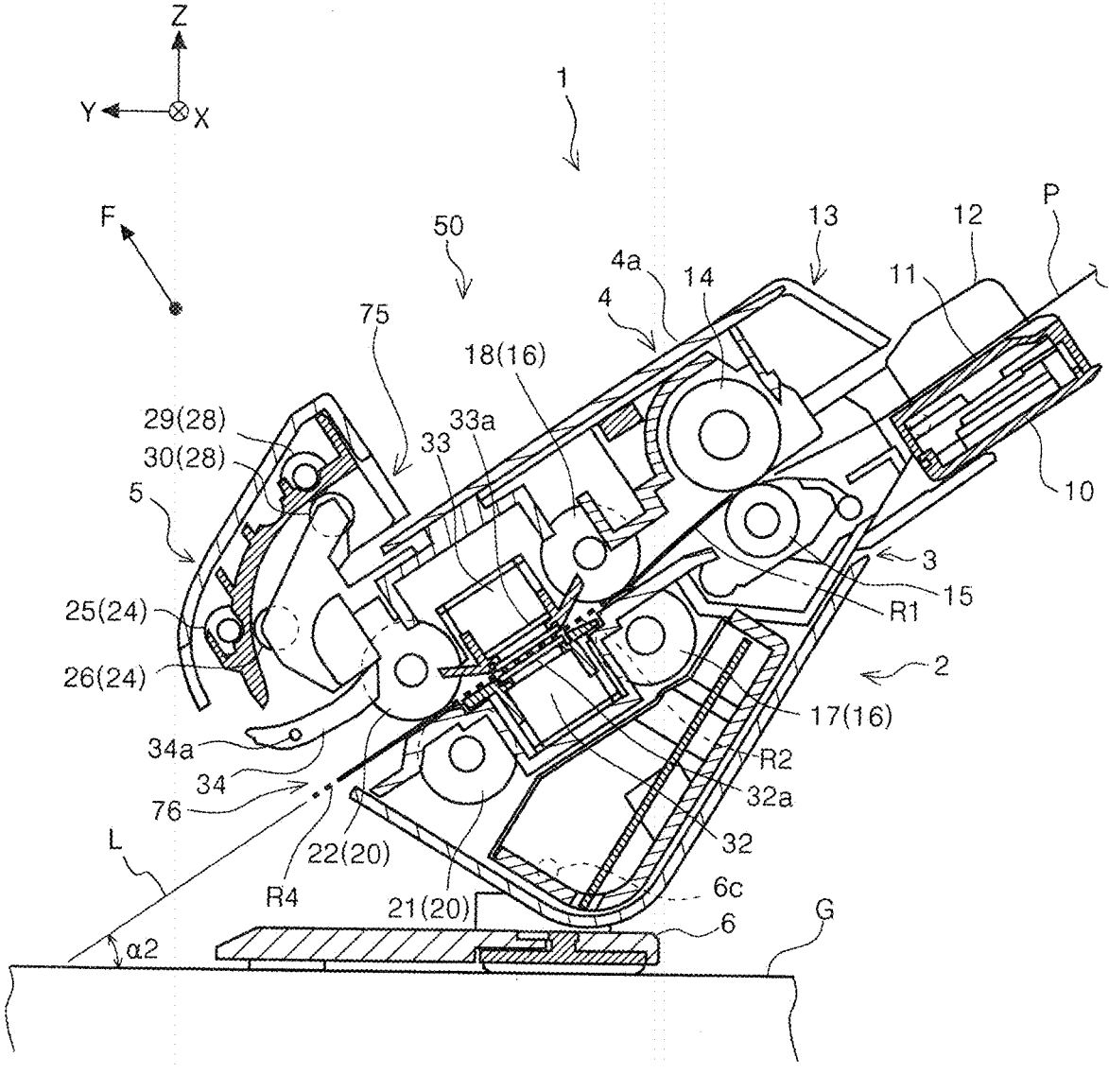
FIG. 3 is a cross-sectional view, as viewed from the width direction, of the document transport path of the scanner when the device main body is in a pamphlet reading posture.

The device main body 2 is rotatable centered on the main body rotation shaft 6c (see FIGS. 2 and 3) with respect to the main body support section 6. In this embodiment, the device main body 2 can be held in two postures by rotating. The two postures of the device main body 2 are shown in FIGS. 2 and 3, and the posture of FIG. 2 is hereinafter referred to as a normal reading posture, and the position of FIG. 3 is referred to as a pamphlet reading posture. The normal reading posture of the device main body 2 is a posture in which the reading transport path R2 is connected to the inversion transport path R3. The pamphlet reading posture of the device main body 2 is a posture in which the reading transport path R2 is connected to a non-inversion transport path R4.

In the present embodiment, the posture of the device main body 2 is switched by the user applying an external force to the device main body 2. The normal reading posture and the pamphlet reading posture of the device main body 2 are respectively maintained by snap fit portions (not shown). It is also desirable that the device main body 2 be provided with a handle for improving operability in the posture switching operation by the user.

Instead of a configuration in which the posture switching of the device main body 2 is performed by the user applying an external force to the device main body 2, a configuration may be used in which posture switching is performed by power such as a motor rotating the device main body 2.

An angle α1 shown in FIG. 2 and an angle α2 shown in FIG. 3 are angles formed between the reading transport path R2 and a mounting surface G of the device (both to be described later). The angle α2 in the pamphlet reading posture is smaller than the angle α1 in the normal reading posture.

In the normal reading posture, the projection area of the device main body 2 on the mounting surface G on which the scanner 1 is mounted is minimized, that is, it is a posture in which the footprint of the device main body 2 is minimized.

Note that footprint in the present specification refers to the occupied area of the device main body 2 on the X-Y plane when the device main body 2 is viewed from above.

The normal reading posture is suitable for reading a sheet-like document, that is, a document having low rigidity and in which deflection easily occurs. The pamphlet reading posture is suitable for reading a document such as a plastic card or a pamphlet that has high rigidity and in which deflection tends not to occur.

Note that as is apparent from FIGS. 2 and 3, the inclination angle of the document support section 11 with respect to the mounting surface G is smaller in the pamphlet reading posture than in the normal reading posture.

Similarly, as is apparent from FIGS. 2 and 3, the inclination angle of the reading transport path R2 with respect to the mounting surface G is smaller in the pamphlet reading posture than in the normal reading posture.

Similarly, as is apparent from FIGS. 2 and 3, the inclination angle of the straight line that connects the document nip position of the first transport roller pair 16 (to be described later) and the document nip position of the second transport roller pair 20 (to be described later) with respect to the mounting surface G is smaller in the pamphlet reading posture than in the normal reading posture.

An operation section 7 consisting of multiple operation buttons, including a power button, is provided on the front surface of the device.

A first discharge port 75 is formed on the front surface of the device for discharging a document passing through the inversion transport path R3 (to be described later). Reference numeral 4*a* denotes a discharge tray for supporting, in an inclined posture, a document discharged from the first discharge port 75. A discharge tray 4*a* forms the +Y direction surface of the second unit 4.

Next, with reference to FIGS. 2 and 3, the configuration of the document transport path in the scanner 1 will be described. The document to be fed is supported in an inclined posture by the document support section 11. Reference numeral P denotes a supported document. When plural sheets of document are supported by the document support section 11, the uppermost sheet of document is fed downstream by a feed roller 14. The document support section 11 is formed in an upper opening and closing section 10. The upper opening and closing section 10 is rotatable about a rotation shaft (not shown), and opens and closes the feed port 13 by rotating. FIG. 1 shows a state in which the upper opening and closing section 10 is closed, and FIGS. 2 and 3 show a state in which the upper opening and closing section 10 is open. The upper opening and closing section 10 constitutes the first unit 3.

The document support section 11 is provided with a pair of edge guides 12 for guiding side edges of the document. The pair of edge guides 12 is provided so as to be slidable in the document width direction (X-axis direction). The pair of edge guides 12 are provided so as to be interlocked with each other by a rack and pinion mechanism (not shown) so as to separate from each other or approach each other with the center position in the width direction of the document interposed therebetween. That is, the scanner 1 employs a so-called center feeding system.

The feed roller 14 is provided in the second unit 4. The feed roller 14 is rotated by power from a motor (not shown). A separation roller 15 is provided at a position opposed to the feed roller 14 in the first unit 3. Rotational torque is applied to the separation roller 15 by a torque limiter (not shown), and the separation roller 15 suppresses multi-feed of documents. The feed roller 14 and the separation roller 15 are provided at a center position in the width direction of the document.

Note that a separation pad may be provided instead of the separation roller 15.

In the present embodiment, the feed roller 14 is provided on the upper side of the document placed on the document support section 11 and is configured to supply starting from the uppermost document. However, the feed roller 14 may be provided on the lower side of the document placed on the document support section 11 and configured to supply starting from the lowermost document.

The first transport roller pair 16 is provided downstream of the feed roller 14 and the separation roller 15. The first transport roller pair 16 is composed of a first lower roller 17 provided in the first unit 3 and a first upper roller 18 provided in the second unit 4. The first upper roller 18 is provided so as to be movable toward and away from the first lower roller 17, and is pressed toward the first lower roller 17 by a pressing member (not shown), for example, a coil spring.

The first lower roller 17 and the first upper roller 18 rotate by receiving power from a motor (not shown). The two of the first lower roller 17 and the first upper roller 18 are provided so as to sandwich the center position in the document width direction.

When the second unit 4 is closed against the first unit 3, the first lower roller 17 and the first upper roller 18 come into contact with each other. When the second unit 4 is opened up with respect to the first unit 3, the first upper roller 18 separates from the first lower roller 17.

A first reading section 32 and a second reading section 33 are arranged opposite to each other downstream of the first transport roller pair 16. The first reading section 32 is provided in the first unit 3, and the second reading section 33 is provided in the second unit 4. The first reading section 32 reads the lower surface (first surface) of the document supported by the document support section 11, and the second reading section 33 reads the upper surface (second surface) of the document supported by the document support section 11. The second reading section 33 is provided so as to be movable toward and away from the first reading section 32, and is pressed toward the first reading section 32 by a pressing member (not shown), for example, a coil spring.

In the present embodiment, the first reading section 32 and the second reading section 33 are constituted by contact image sensor modules (CISM). Reference numeral 32a denotes a contact glass constituting the first reading section 32, and reference numeral 33a denotes a contact glass constituting the second reading section 33.

A second transport roller pair 20 is provided downstream of the first reading section 32 and the second reading section 33. The second transport roller pair 20 is composed of a second lower roller 21 provided in the first unit 3 and a second upper roller 22 provided in the second unit 4. The second upper roller 22 is provided so as to be movable toward and away from the second lower roller 21, and is pressed toward the second lower roller 21 by a pressing member (not shown), for example, a coil spring.

The second lower roller 21 and the second upper roller 22 rotate by receiving power from a motor (not shown). The two of the second lower roller 21 and the second upper roller 22 are provided so as to sandwich the center position in the document width direction.

When the second unit 4 is closed against the first unit 3, the second lower roller 21 and the second upper roller 22 come into contact with each other. When the second unit 4 is opened up from the first unit 3, the second upper roller 22 separates from the second lower roller 21.

The single dot chain line indicated by reference numeral R1 is a document feed path and the document feed path R1 is defined from the nip position between the feed roller 14 and the separation roller 15 to the nip position between the first transport roller pair 16. The broken line indicated by the reference numeral R2 is a reading transport path, and the reading transport path R2 extends from the nip position of the first transport roller pair 16 to the nip position of the second transport roller pair 20. The reading transport path R2 is a document transport path that faces the first reading section 32 and the second reading section 33, and is an example of the first transport path.

When the device main body 2 is in the normal reading posture shown in FIG. 2, the inversion transport path R3, which is used to invert the read document to face upward before discharging it, is formed downstream of the reading transport path R2. The inversion transport path R3 is a document transport path extending from the nip position of the second transport roller pair 20 to the nip position of a fourth transport roller pair 28, and is a transport path for, as indicated by two-dot chain line in FIG. 2, bending and inverting the document transported obliquely downward and discharging the document obliquely upward from the first discharge port 75. In the present embodiment, the entire inversion transport path R3 is configured as an inversion path for inverting the transported document to face upward, but the inversion transport path R3 may further include, for example, a linear transport path, and the inversion path for inverting the document to face upward may constitute a part of the inversion transport path R3.

When the device main body 2 is in the pamphlet reading posture shown in FIG. 3, the non-inversion transport path R4 for discharging the read document, without inverting it, is formed downstream of the reading transport path R2. The non-inversion transport path R4 is a document transport path downstream of the nip position of the second transport roller pair 20 and, as indicated by a two-dot chain line in FIG. 3, is a document transport path for discharging a document that was transported obliquely downward in the reading transport path R2 obliquely downward from the second discharge port 76 as is, without curving and inverting the document.

Note that the second transport roller pair 20 functions as a discharge roller pair for discharging the document from the non-inversion transport path R4.

The outer side of the inversion transport path R3 is formed by a rotatable flap 34. The posture of the flap 34 is changed by rotating the flap 34 around a flap rotation shaft 34a. When the device main body 2 assumes the normal reading posture, the flap 34 assumes a first transport path connecting posture (FIG. 2) to connect the inversion transport path R3 to the reading transport path R2. When the device main body 2 assumes the pamphlet reading posture, the flap 34 assumes a second transport path connecting posture (FIG. 3) in which the non-inversion transport path R4 is connected to the reading transport path R2.

The posture of the flap 34 is switched by a solenoid (not shown). However, the posture of the flap 34 may be switched by applying an external force by the user.

The inversion transport path R3 is provided with a third transport roller pair 24 and the fourth transport roller pair 28.

The third transport roller pair 24 includes a third drive roller 25 provided in the third unit 5 and a third driven roller 26 provided in the second unit 4. The third driven roller 26 is provided so as to be movable toward and away from the third drive roller 25, and is pressed toward the third drive roller 25 by a double torsion spring 55 (to be described later). The third drive roller 25 is driven by a motor (not shown). The third driven roller 26 is a roller that is driven to rotate.

The fourth transport roller pair 28 includes a fourth drive roller 29 provided in the third unit 5 and a fourth driven roller 30 provided in the second unit 4. The fourth driven roller 30 is provided so as to be movable toward and away from the fourth drive roller 29, and is pressed toward the fourth drive roller 29 by a double torsion spring 55 (to be described later). The fourth drive roller 29 is driven by a motor (not shown). The fourth driven roller 30 is a roller that is driven to rotate.

The fourth drive roller 29 is an example of a discharge drive roller, and the fourth driven roller 30 is an example of a discharge driven roller. The third drive roller 25 is an example of a transport drive roller provided upstream of the fourth transport roller pair 28, and the third driven roller 26 is an example of a transport driven roller provided upstream of the fourth transport roller pair 28.

Next, the medium discharge device 50 will be described.

Figure 4:
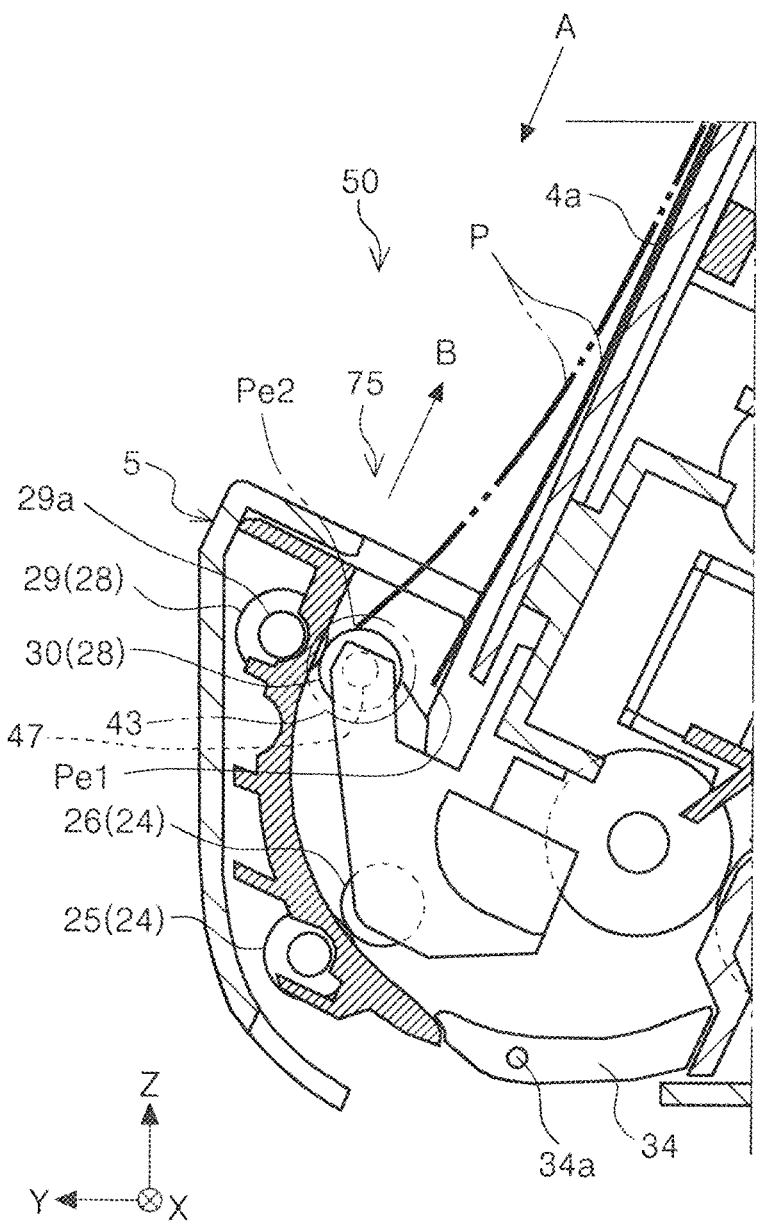
FIG. 4 is a cross-sectional side view of the medium discharge device as viewed from the width direction.

In FIG. 4, the medium discharge device 50 includes the fourth drive roller 29, which contacts the first surface of a discharged document, and the fourth driven roller 30, which contacts the second surface, which is opposite to the first surface of the discharged document. The fourth drive roller 29 is an example of a discharge drive roller, and the fourth driven roller 30 is an example of a discharge driven roller. The fourth drive roller 29 and the fourth driven roller 30 are positioned at a lower portion of the discharge tray 4a, and discharge the document in an obliquely upward direction (the direction of the arrow B) with the second side of the document facing down. The medium discharge device 50 is provided with the discharge tray 4a.

Here, a problem in discharging the document will be described. The letter P indicates a document to be discharged, solid line indicates the posture of the document at the center position in the width direction, and two dot chain line indicates the posture of the document at a side edge position in the width direction. Reference numeral Pe1 denotes the rear end of the document at the center position in the width direction, and reference numeral Pe2 denotes the rear end of the document at the side edge position in the width direction. Reference numeral 43 denotes a first discharge assisting member that provides a kick-out effect, that is, an effect of kicking out the rear end of the document in the direction of arrow B, in the vicinity of the center position in the width direction of the rear end of the document. The first discharge assisting member 43 is provided integrally with the fourth driven roller 30, and rotates together with the fourth driven roller 30.

Since the first discharge assisting member 43 provides a kick-out effect to the document rear end Pe1, the document rear end Pe1 is suppressed from remaining on the fourth driven roller 30. However, if only the first discharge assisting member 43 is provided, a kick-out effect cannot be given to the document rear end Pe2 and, as shown in FIG. 4, the document rear end Pe2 tends to remain on the fourth driven roller 30. When the next document is discharged in this state, the state in which the documents are stacked on the discharge tray 4a is disturbed. Such a problem is particularly likely to occur when the rear end Pe2 of the document is curled.

Figure 5:
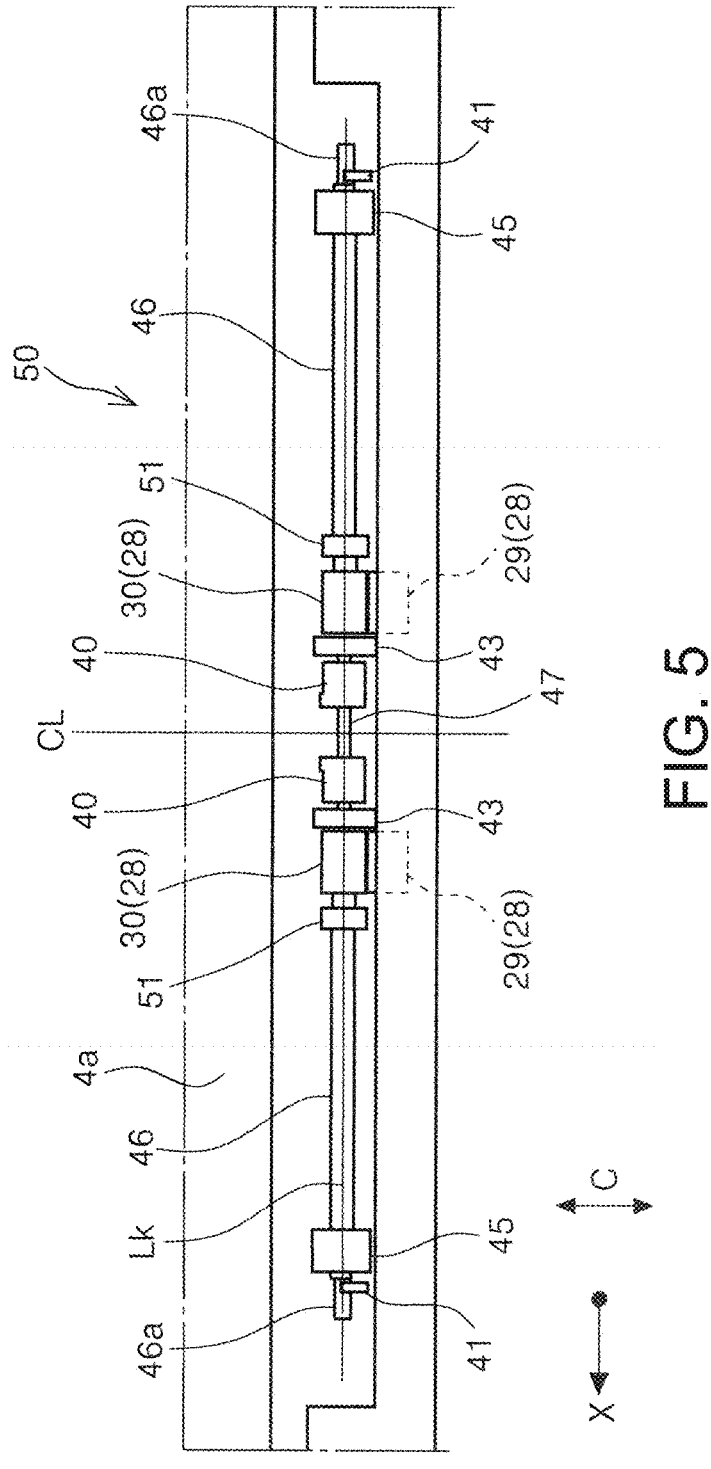
FIG. 5 is a view from the A arrow direction of FIG. 4.
Figure 6:
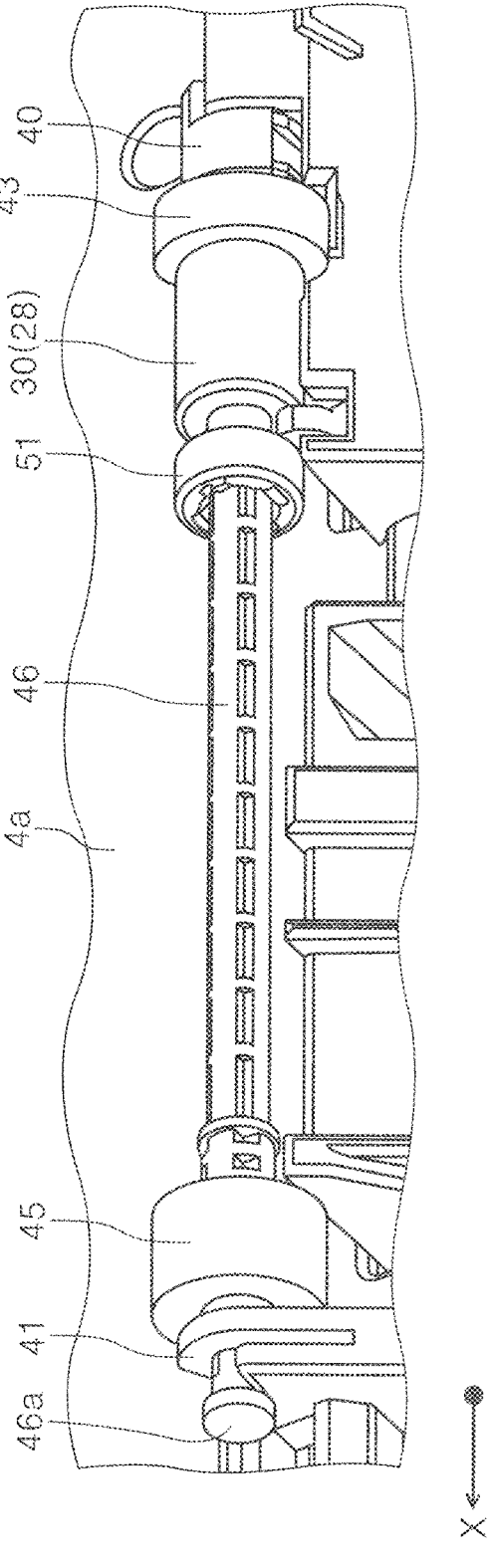
FIG. 6 is a perspective view of the medium discharge device.

In consideration of the above problem, the medium discharge device 50 according to the present embodiment has the following configuration. In FIGS. 5 and 6, the medium discharge device 50 is provided with the first discharge assisting member 43, which is a member that contacts the second surface of the document to be discharged, has a larger diameter than the fourth driven roller 30, and rotates by obtaining torque from the fourth driven roller 30, and the second discharge assisting member 45, which is a member that contacts the second surface of the medium to be discharged, has a larger diameter than the fourth driven roller 30, and rotates by obtaining torque from the fourth driven roller 30.

The second discharge assisting member 45 is disposed to the outside of the first discharge assisting member 43 with respect to the width direction (X-axis direction), which intersects with the medium discharge direction (direction B in FIG. 4). The fourth driven roller 30 and the first discharge assisting member 43 are provided so as to be displaceable in the direction (the direction C in FIG. 5) of moving toward and away from the fourth drive roller 29, and the torque of the fourth driven roller 30 is transmitted to the second discharge assisting member 45 via a shaft 46 and a first universal joint 51.

By this, the second discharge assisting member 45 can provide a kick-out effect to the side edges at the rear end of the document or in the vicinity thereof. Since the power of the fourth driven roller 30 is transmitted to the second discharge assisting member 45 through the shaft 46 and the first universal joint 51, the second discharge assisting member 45 can easily maintain its position (position in the C direction) with respect to the document even if the fourth driven roller 30 is displaced, and a kick-out effect can be applied to the side edges at the rear end of the document or the vicinity thereof without being affected by displacement of the fourth driven roller 30.

This will be further described below. In this embodiment, the first discharge assisting member 43 and the second discharge assisting member 45 are made of a cylindrical elastic member, for example, a sponge. However, the present disclosure is not limited to this, and other elastic members may be used. With such an elastic member, the kick-out effect can be appropriately applied to the rear end of the document.

In FIG. 5, the line indicated by the reference CL is a line passing through the center position of the document in the width direction and is a center line along the document discharge direction. Fourth drive rollers 29, fourth driven rollers 30, first discharge assisting members 43, and second discharge assisting members 45 and, as will be described later, first universal joints 51, shafts 46, first bearing sections 40, and second bearing sections 41, are disposed at positions symmetrical with respect to the center line CL. By this, it is possible to apply the kick-out force uniformly along the width direction to the rear end of the document.

Note that in this embodiment, the width of the second discharge assisting member 45 in the X-axis direction is formed larger than the width of the first discharge assisting member 43, so that a kick-out effect can be appropriately applied to the side edges at the rear end of the document or the vicinity thereof.

However, the width of the second discharge assisting member 45 may be the same as the width of the first discharge assisting member 43, or the width of the second discharge assisting member 45 may be smaller than the width of the first discharge assisting member 43.

Figure 7:
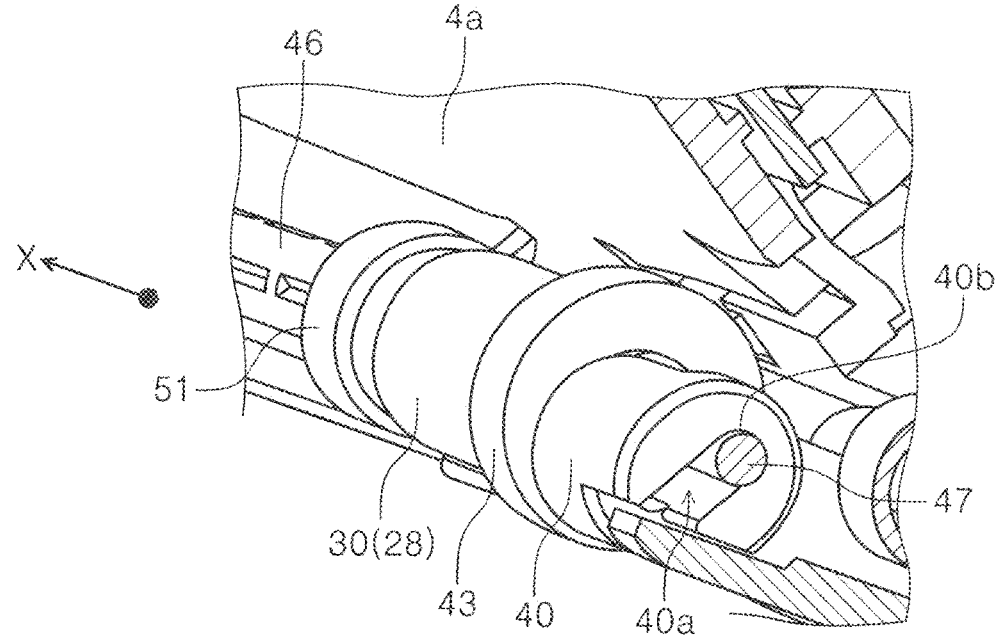
FIG. 7 is a perspective view of a first bearing section.

Reference numeral 47 denotes a driven roller shaft common to the two fourth driven rollers 30, and the driven roller shaft 47 is axially supported by first bearing sections 40. Note that in this embodiment, the driven roller shaft 47 does not rotate with respect to the first bearing section 40, and the fourth driven roller 30 rotates with respect to the driven roller shaft 47. As shown in FIG. 7, an elongated groove 40a is formed in the first bearing section 40, and a restricting section 40b is formed in the elongated groove 40a. The driven roller shaft 47 abuts against the restricting section 40b and, by this, displacement is restricted in the direction in which the driven roller shaft 47 advances toward the discharge tray 4a.

That is, the restricting section 40b restricts displacement of the fourth driven roller 30 in the direction of advancing toward the discharge tray 4a. As a result, the following effects can be obtained. When the first discharge assisting member 43, which is displaced together with the fourth driven roller 30, comes into contact with the document supported on the discharge tray 4a, the state in which document on the discharge tray 4a is stacked may be disturbed. However, as described above the displacement of the first discharge assisting member 43 in the direction in which the first discharge assisting member 43 advances toward the discharge tray 4a is restricted by the restricting section 40b, so that the first discharge assisting member 43 can be suppressed from coming into contact with the document supported on the discharge tray 4a, and the state in which the document is stacked on the discharge tray 4a can be appropriately maintained.

The fourth driven roller 30 transmits power to the first universal joint 51. The shaft 46 is connected to the first universal joint 51, and the power is transmitted from the first universal joint 51 to the shaft 46, even if the posture of the shaft 46 with respect to the first universal joint 51 changes. The shaft end section 46a of the shaft 46 is axially supported by the second bearing section 41. The second bearing section 41 supports the shaft 46 so as to allow the posture of the shaft 46 to change. The shaft 46 is provided with the second discharge assisting member 45.

Since the shaft 46 is axially supported in this way by the second bearing section 41 located to the outside of the second discharge assisting member 45 in the width direction, the second discharge assisting member 45 can appropriately maintain its position (the position in the C direction in FIG. 5) with respect to the document when the fourth driven roller 30 is displaced.

Figure 11:
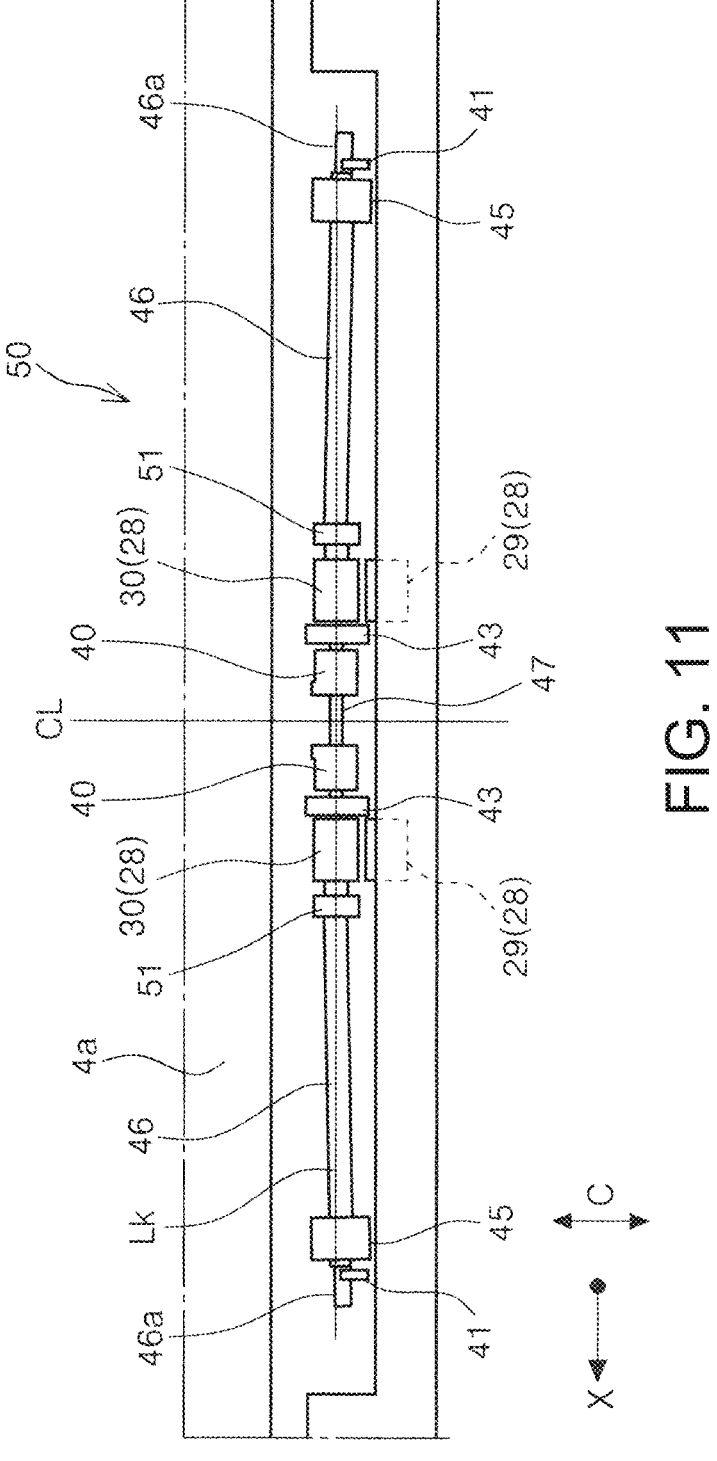
FIG. 11 is a view showing a state in which the fourth driven roller and the first discharge assisting member are displaced from the state of FIG. 5.

Note that in FIG. 5, a line Lk is the axial center line of the driven roller shaft 47. When the fourth driven roller 30 and the first discharge assisting member 43 are displaced upward in FIG. 5 in accordance with the thickness of a document, the shaft 46 is inclined with respect to the line Lk as shown in FIG. 11, whereby the second discharge assisting member 45 also inclines, but the position in the C direction is substantially maintained.

Figure 8:
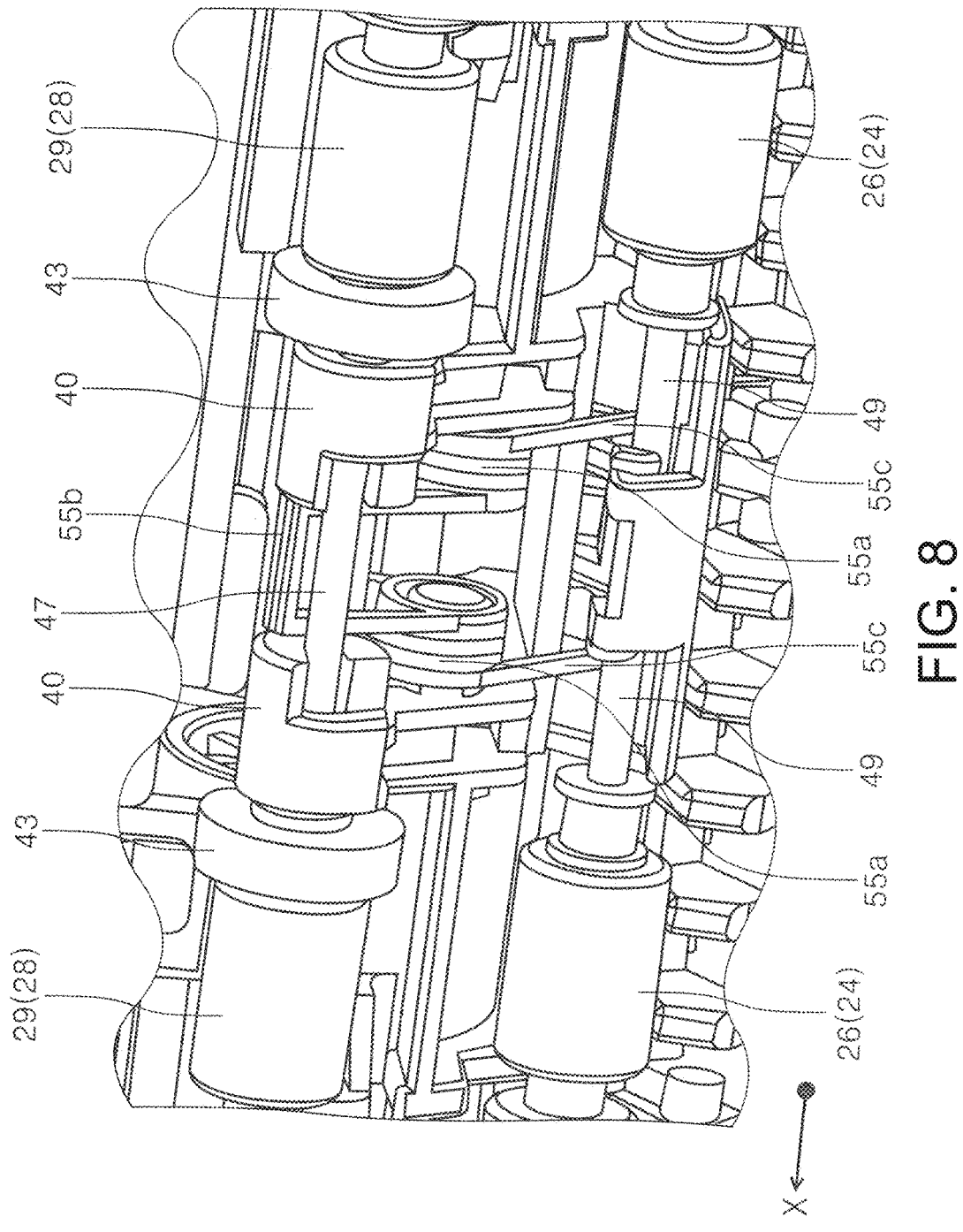
FIG. 8 is a perspective view of a third driven roller, a fourth driven roller, and a double torsion spring.
Figure 9:
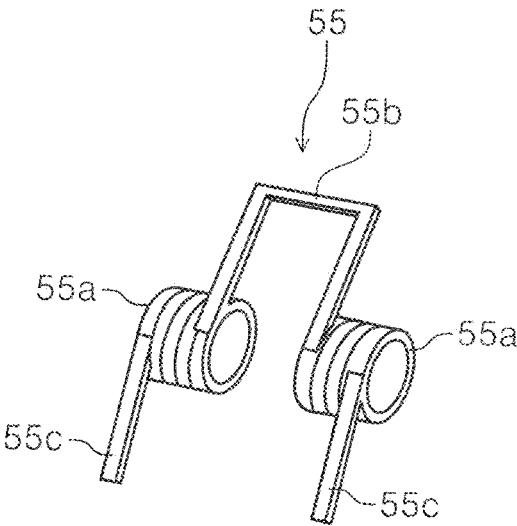
FIG. 9 is a perspective view of the double torsion spring.
Figure 10:
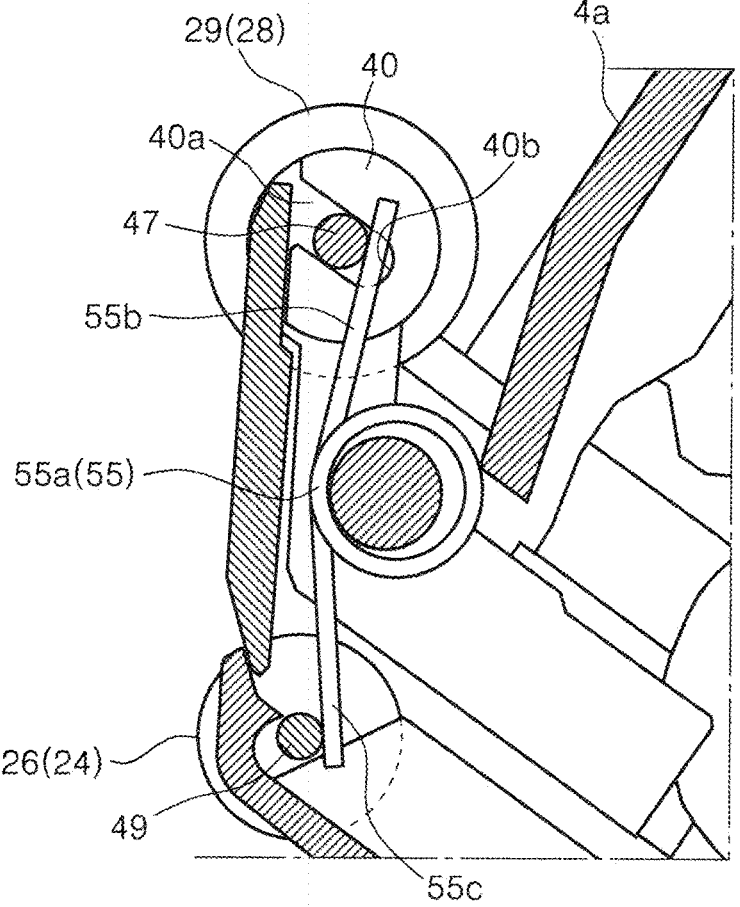
FIG. 10 is a side view of the third driven roller, the fourth driven roller, and the double torsion spring.

As shown in FIGS. 8, 9, and 10, the driven roller shaft 47 is pressed toward the fourth drive roller 29 by the double torsion spring 55. The double torsion spring 55 includes coil sections 55a, a first arm section 55b, and second arm sections 55c, and the driven roller shaft 47 is pressed by the first arm section 55b.

The second arm sections 55c press the rotation shaft 49 of the third driven roller 26 toward the third drive roller 25.

In this way, since the fourth driven roller 30 and the third driven roller 26 are pressed against the opposing roller by the double torsion spring 55, the number of parts and the number of assembling steps can be reduced.

Figure 12:
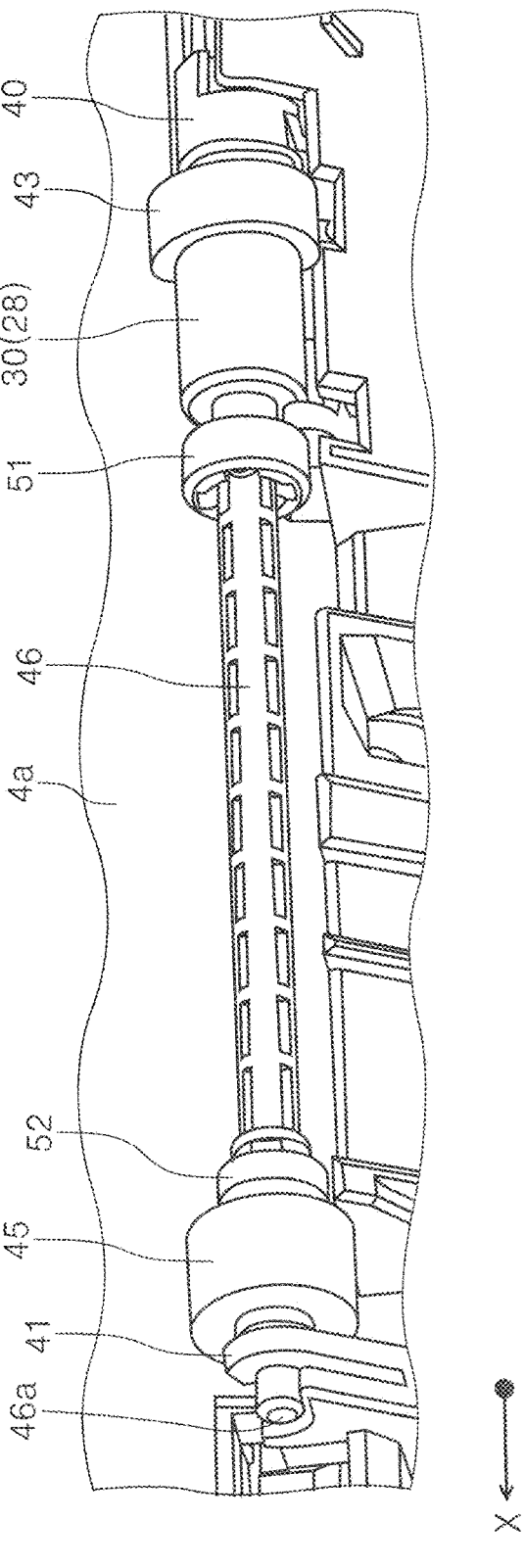
FIG. 12 is a perspective view of a medium discharge device according to another embodiment.

Next, another embodiment will be described with reference to FIG. 12. This embodiment differs from the embodiment described with reference to FIGS. 5 to 11 in that it includes a second universal joint 52. That is, in the present embodiment, two universal joints including the first universal joint 51 and the second universal joint 52 are provided between the fourth driven roller 30 and the second discharge assisting member 45. According to the present embodiment, when the fourth driven roller 30 is displaced, it is possible to suppress the second discharge assisting member 45 from tilting together with the shaft 46, and to maintain the posture of the second discharge assisting member 45 in addition to its position with respect to the document.

Note that the number of universal joints is not limited to two, and three or more universal joints may be provided.

Figure 13:
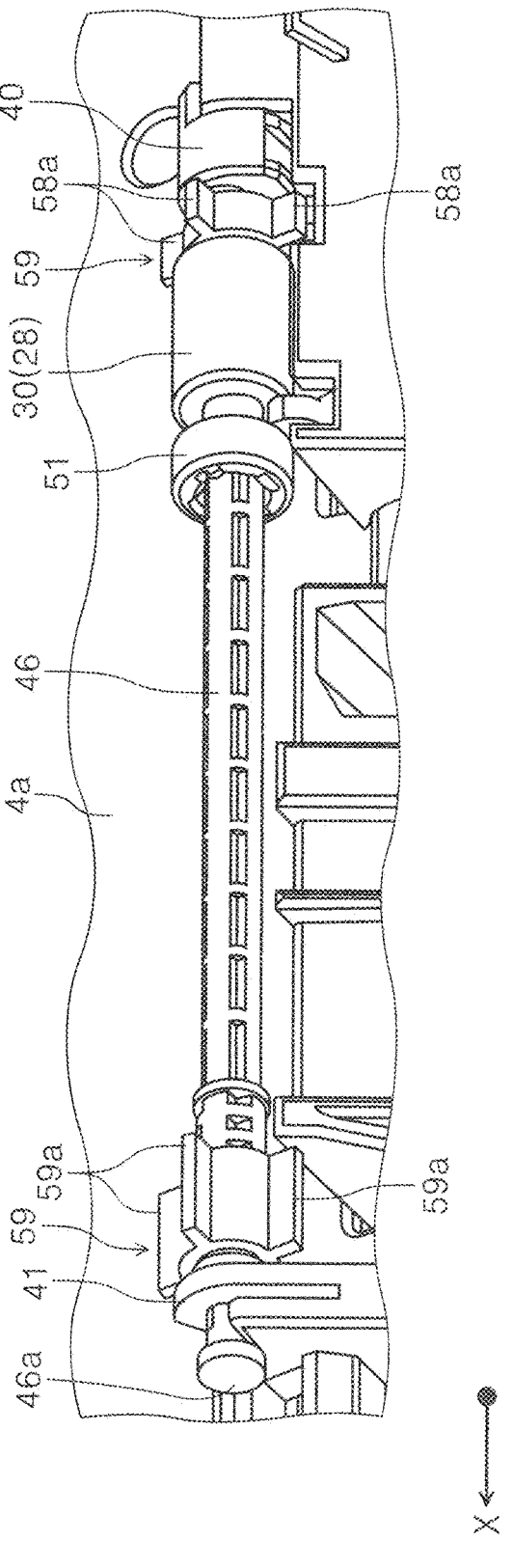
FIG. 13 is a perspective view of a medium discharge device according to another embodiment.

Next, another embodiment will be described with reference to FIG. 13. The embodiment differs from the one described with reference to FIGS. 5 to 11 in the form of the first discharge assisting member and the second discharge assisting member and, in this embodiment, a first discharge assisting member 58 is provided in place of the aforementioned first discharge assisting member 43, and a second discharge assisting member 59 is provided in place of the aforementioned second discharge assisting member 45.

The first discharge assisting member 58 has a plurality of first projections 58a at regular intervals along the peripheral direction, and the second discharge assisting member 45 has a plurality of second projections 59a at regular intervals along the peripheral direction. The first discharge assisting member 58 and the second discharge assisting member 45 may be formed of an elastic member such as sponge or rubber, or may be formed of a resin material.

In this way, since the first discharge assisting member 58 has a plurality of first projections 58a along the peripheral direction, and the second discharge assisting member 45 has a plurality of second projections 59a along the peripheral direction, it is possible to appropriately apply a kick-out effect to the rear end of the document.

Note that although the number of first projections 58a and the number of second projections 59a are the same in this embodiment, they may be different. In this embodiment, the phase of the first projections 58a and the second projections 59a coincide with each other, but may be different from each other. In the present embodiment, the phase of the first projections 58a provided on one side of the center line CL (see FIG. 5) in the width direction coincide with the phase of the first projections 58a provided on the other side. In this embodiment, the phase of the second projection 59a provided on one side of the center line CL (see FIG. 5) in the width direction coincides with the phase of the second projection 59a provided on the other side.

Next, quick-drying lubricant and non-quick-drying lubricant will be described with reference to FIGS. 14 and 15.

Figure 14:
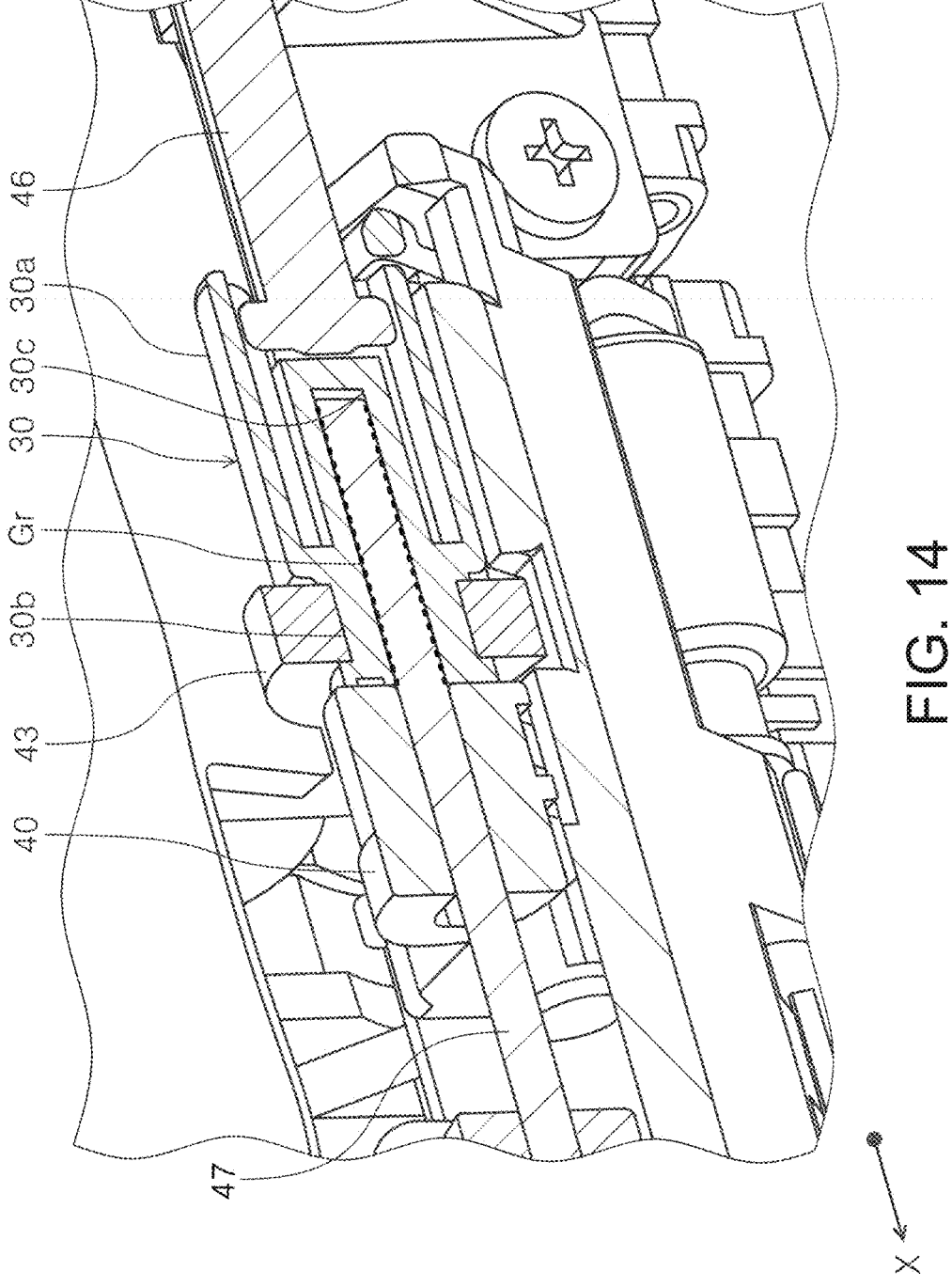
FIG. 14 is a sectional perspective view of the fourth driven roller and a driven roller shaft.

As shown in FIG. 14, the fourth driven roller 30 is integrally provided with a roller main body section 30a and a flange section 30b. The fourth driven roller 30 is made of, for example, polyoxymethylene (POM). The first discharge assisting member 43 is provided on the flange section 30b.

The fourth driven roller 30 has a shaft hole 30c, and the driven roller shaft 47 is inserted into the shaft hole 30c.

Since the driven roller shaft 47 does not rotate and the fourth driven roller 30 rotates with respect to the driven roller shaft 47 as described above, the inner peripheral surface of the shaft hole 30c and the outer peripheral surface of the driven roller shaft 47 slide against each other with rotation of the fourth driven roller 30. Therefore, a quick-drying lubricant Gr as indicated in broken line is used between the inner peripheral surface of the shaft hole 30c and the outer peripheral surface of the driven roller shaft 47.

"Quick-drying lubricant" as used in the present specification means a lubricant that, when applied to an object to be coated, rapidly forms a lubricating film on the object to be coated, that has no fluidity after the lubricating film is formed, and that hardly flows even when an external force is applied thereto.

As an example of the quick-drying lubricant Gr, a volatile solvent containing a lubricating component can be used, for example, a fluorine-based solvent containing a lubricating component can be used. When such a quick-drying lubricant Gr is applied to an object to be coated, the solvent rapidly volatilizes to form a lubricating film on the object to be coated. Examples of the lubricating component include a polytetrafluoroethylene (PTFE) powder.

Note that "a lubricant having no quick-drying property", that is, a "non-quick-drying lubricant," as used in the present specification means a lubricant having fluidity after the lubricant is applied to an object to be coated and when the device is used and, in particular, a lubricant capable of adhering to a medium to be transported due to the fluidity. Examples of a non-quick-drying lubricant include a lubricating oil obtained by adding an additive to a base oil and grease obtained by further adding a thickener to the lubricating oil.

In a configuration where the fourth driven roller 30 has the shaft hole 30c through which the driven roller shaft 47 passes, and the inner peripheral surface of the shaft hole 30c and the outer peripheral surface of the driven roller shaft 47 slide against each other as the fourth driven roller 30 rotates, if a non-quick-drying lubricant were to be used between the inner peripheral surface of the shaft hole 30c and the outer peripheral surface of the driven roller shaft 47, then some of the non-quick-drying lubricant may move to the first discharge assisting member 43, adhere to the document, and possibly stain the document. In particular, since the first discharge assisting member 43 is formed from sponge, which is an example of an elastic material, the first discharge assisting member 43 has a property of easily absorbing lubricant, which could adhere to and stain the document.

Note that in the present embodiment, after the lubricant is applied to the outer peripheral surface of the driven roller shaft 47, the fourth driven roller 30 is fitted to the driven roller shaft 47 in the +X direction. By this, if non-quick-drying lubricant were used as the lubricant, the surplus of the non-quick-drying lubricant would move to the first bearing section 40 side via the flange section 30b, and accumulate between the flange section 30b and the first bearing section 40. If non-quick-drying lubricant were to accumulate between the flange section 30b and the first bearing section 40, the non-quick-drying lubricant might move to the first discharge assisting member 43 as the fourth driven roller 30 rotates.

However, as described above, since quick-drying lubricant Gr is used as lubricant between the inner peripheral surface of the shaft hole 30c and the outer peripheral surface of the driven roller shaft 47, it is possible to suppress that lubricant moves to the first discharge assisting member 43, and it is possible to suppress that lubricant adheres to and stains the document.

In this embodiment, the fourth driven roller 30 has a flange section 30b, and the first discharge assisting member 43 is provided on the flange section 30b.

In such a configuration, when lubricant is interposed between the inner peripheral surface of the shaft hole 30c and the outer peripheral surface of the driven roller shaft 47, a portion of the lubricant can easily move to the first discharge assisting member 43 and is likely to stain the document. However, since quick-drying lubricant Gr is used as lubricant as described above, it is possible to suppress that the lubricant adheres to and stains the document.

In the present embodiment, the first discharge assisting member 43 is made of a sponge, which is an example of an elastic material. As a result, the rear end of the document can be suitably pushed out in the discharge direction.

When the first discharge assisting member 43 is made from an elastic material, the first discharge assisting member 43 tends to absorb the lubricant, which easily adheres to the document, and easily stains the document. However, since quick-drying lubricant Gr is used as the lubricant as described above, it is possible to suppress that the lubricant adheres to the document and stains the document.

When the first discharge assisting member 58 is used instead of the first discharge assisting member 43 as described with reference to FIG. 13, the first discharge assisting member 58 has a plurality of first projections 58a along the peripheral direction on its outer periphery. According to such a configuration, the rear end of the document can be appropriately fed out in the discharge direction.

In such a configuration, the first projections 58a may strongly press against the document, and if the first discharge assisting member 58 has absorbed lubricant, the lubricant is likely to adhere to the document from the first projections 58a, that is, the document is likely to be stained.

However, since quick-drying lubricant Gr is used as the lubricant as described above, it is possible to suppress that the lubricant adheres to and stains the document.

Figure 15:
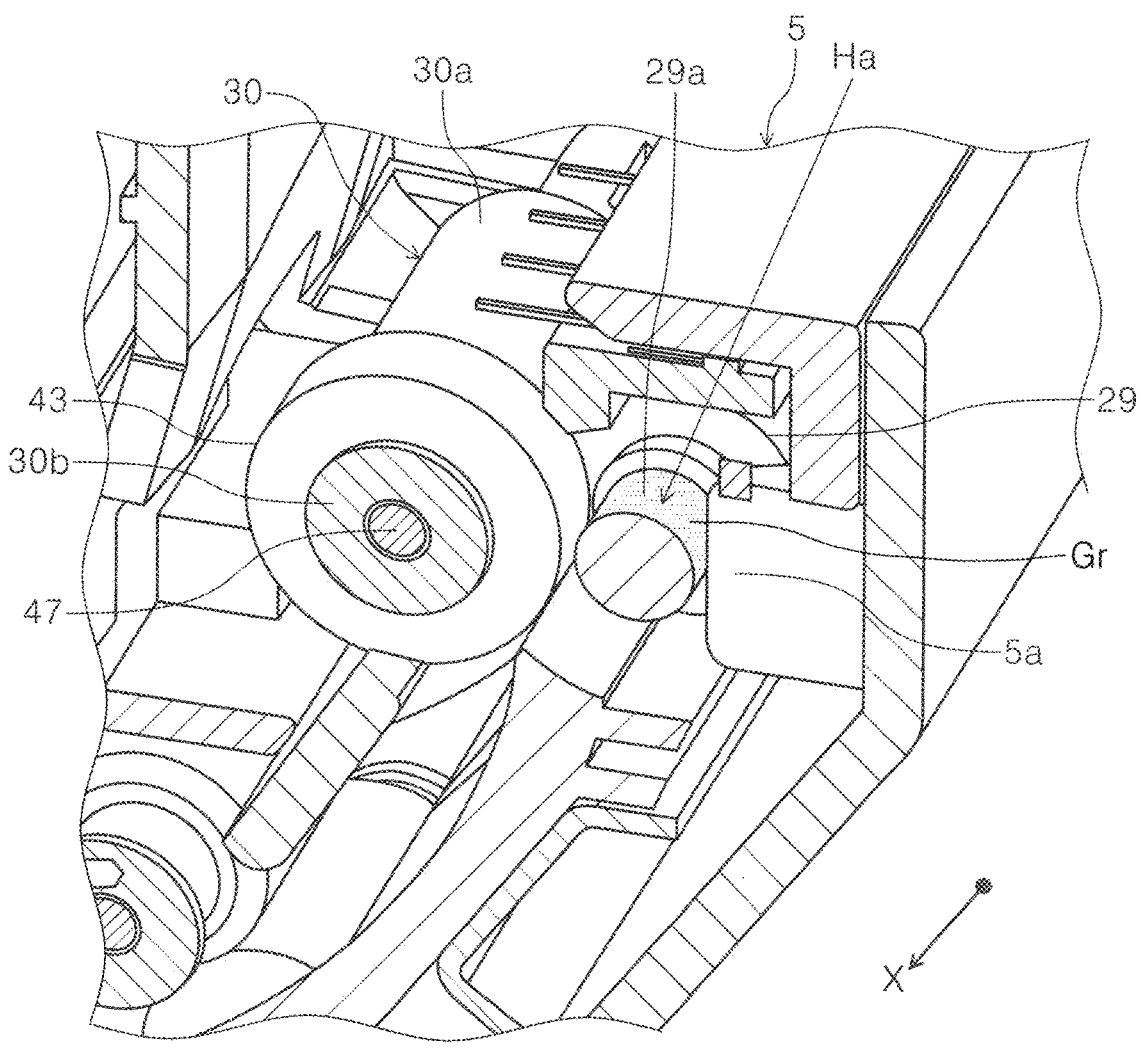
FIG. 15 is a view showing the positional relationship of the first discharge assisting member, a drive roller shaft, and a restricting section.

In the present embodiment, as shown in FIG. 15, a drive roller shaft 29a, which is the rotation shaft of the fourth drive roller 29, and a restricting section 5a for restricting deflection of the drive roller shaft 29a are provided, and the quick-drying lubricant Gr is applied to the outer peripheral surface of the drive roller shaft 29a at a position facing the restricting section 5a. Since the restricting section 5a is provided in the third unit 5 and the restricting section 5a is provided at a position facing the outer peripheral surface of the drive roller shaft 29a, deflection of the drive roller shaft 29a caused when the fourth driven roller 30 is pressed against the fourth drive roller 29 is restricted.

Here, when the quick-drying lubricant Gr is applied to the outer peripheral surface of the drive roller shaft 29a, more specifically, to the region facing the restricting section 5a as indicated by the arrow Ha, it is possible to suppress an increase in the rotational load of the drive roller shaft 29a when the drive roller shaft 29a contacts the restricting section 5a.

Here, since the outer peripheral surface of the drive roller shaft 29a is opposed to the first discharge assisting member 43, when a lubricant is applied to the outer peripheral surface of the drive roller shaft 29a, a part of the lubricant may move to the first discharge assisting member 43, adhere to the document, and stain the document.

However, since the quick-drying lubricant Gr is used as the lubricant as described above, it is possible to suppress the movement of the lubricant to the first discharge assisting member 43, and it is possible to suppress staining of the document due to the lubricant sticking to the document.

Note that when the driven roller shaft 47 has a sliding section at a portion other than the portion facing the inner peripheral surface of the shaft hole 30c, a non-quick-drying lubricant may be used for that sliding section. Alternatively, the quick-drying lubricant Gr may be used for all of the sliding sections.

Similarly, when the drive roller shaft 29a has a sliding section at a position other than the position indicated by the arrow Ha in FIG. 15, a non-quick-drying lubricant may be used for the sliding section, or the quick-drying lubricant Gr may be used for all the sliding sections including the portion indicated by the arrow Ha in FIG. 15.

Alternatively, in the case where components other than the driven roller shaft 47 and the drive roller shaft 29a have sliding sections, the quick-drying lubricant Gr may be used for those sliding sections. For example, the quick-drying lubricant Gr may be used for the first bearing section 40 and the second bearing section 41.

As described with reference to FIG. 12, in the configuration in which the two universal joints of the first universal joint 51 and the second universal joint 52 are provided and the second discharge assisting member 45 is provided at a position adjacent to the second universal joint 52, when a lubricant is applied to the second universal joint 52, a part of the lubricant may easily move to the second discharge assisting member 45 and easily stain the document. Therefore, in such a configuration, by using the quick-drying lubricant Gr in the second universal joint 52, it is possible to suppress movement of the lubricant from the second universal joint 52 to the second discharge assisting member 45 and it is possible to suppress that the lubricant adheres to the document and stains the document.

It is needless to say that the present disclosure is not limited to the embodiments described above, and various modifications can be made within the scope of the disclosure described in the claims, and these are also included within the scope of the present disclosure.

For example, although an example in which the medium discharge device is applied to the image reading device has been described in each of the above embodiments, the medium discharge device may be applied to a recording device that records on a medium. An example of the recording device is an ink jet printer provided with a recording head for ejecting ink onto a medium. In each of the above-described embodiments, for example, a recording head would be provided instead of the second reading section 33, so that an example of a recording device can be configured.

What is claimed is:

1. A medium discharge device comprising:

a discharge drive roller that is a roller configured to contact a first surface of a medium to be discharged and that is rotated by receiving power from a drive source;

a discharge driven roller that is a roller configured to contact a second surface opposite from the first surface of the medium to be discharged and that rotates in a driven manner while nipping the medium between itself and the discharge drive roller;

a driven roller shaft that is a rotation shaft of the discharge driven roller; and a discharge assisting member that is a member configured to contact the second surface of the medium to be discharged, that has a larger diameter than the discharge driven roller, and that rotates integrally with the discharge driven roller, wherein the discharge driven roller has a shaft hole through which the driven roller shaft passes, an inner peripheral surface of the shaft hole and an outer peripheral surface of the driven roller shaft slide against each other with rotation of the discharge driven roller, and a quick-drying lubricant is used between the inner peripheral surface of the shaft hole and the outer peripheral surface of the driven roller shaft.

2. The medium discharge device according to claim 1, wherein the discharge driven roller has a flange section and the discharge assisting member is provided to the flange section.

3. The medium discharge device according to claim 1, wherein the discharge assisting member is formed of an elastic material.

4. The medium discharge device according to claim 3, wherein the discharge assisting member has a plurality of projections along a peripheral direction on an outer periphery thereof.

5. The medium discharge device according to claim 1, further comprising:

a drive roller shaft that is a rotation shaft of the discharge drive roller and a restricting section configured to restrict deflection of the drive roller shaft, wherein the quick-drying lubricant is applied to the outer peripheral surface of the drive roller shaft at a position facing the restricting section.

6. The medium discharge device according to claim 1, wherein the driven roller shaft further includes a sliding section at another portion in addition to a portion facing the inner peripheral surface of the shaft hole and a non-quick-drying lubricant is used at the sliding section.

7. The medium discharge device according to claim 1, wherein the discharge assisting member serves as a first discharge assisting member, and further comprising a second discharge assisting member that is a member configured to contact the second surface of the medium to be discharged, that has a diameter larger than that of the discharge driven roller, and that rotates integrally with the discharge driven roller, the second discharge assisting member is arranged to outside of the first discharge assisting member in a width direction, which intersects the medium discharge direction, the discharge driven roller and the first discharge assisting member are provided so as to be displaceable in a direction of moving toward and away from the discharge drive roller, and torque of the discharge driven roller is transmitted to the second discharge assisting member through a shaft and a universal joint.

8. The medium discharge device according to claim 7, wherein the universal joint serves as a first universal joint, and the first universal joint and a second universal joint that is positioned to outside of the first universal joint in the width direction, are positioned between the discharge driven roller and the second discharge assisting member, the second discharge assisting member is provided at a position adjacent to the second universal joint in the width direction, and the quick-drying lubricant is used in the second universal joint.

9. An image reading device, comprising:

the medium discharge device according to claim 1 and a reading section that is located upstream of the medium discharge device in a transport path of the medium and that reads the medium.

* * * * *